J. Hughes.
App. for Concentrating Acids.

No 65,227. Patented May 28, 1867.

Witnesses
Theo Tusche
Wm Treurn

Inventor
John Hughes
Per Munn & Co
Attorneys

United States Patent Office.

JOHN HUGHES, OF BROOKLYN, NEW YORK, ASSIGNOR TO HIMSELF AND JAMES R. HITCHCOCK, OF NEW YORK CITY.

Letters Patent No. 65,227, dated May 28, 1867.

IMPROVED APPARATUS FOR CONCENTRATING SULPHURIC ACID AND OTHER LIQUIDS.

*The Schedule referred to in these Letters Patent and making part of the same.*

TO ALL WHOM IT MAY CONCERN:

Be it known that I, JOHN HUGHES, of Brooklyn, Kings county, New York, have invented a new and useful improvement in the Manufacture of Sulphuric and other Acids; and I do hereby declare that the following is a full, clear, and exact description of the same, which will enable others skilled in the art to make and use the same, reference being had to the accompanying drawings, forming part of this specification, in which—

Similar letters of reference indicate corresponding parts.

This invention relates to an apparatus for concentrating sulphuric acid to any desired degree, but which may also be used for any other kind of acid.

This invention consists in the use of a series of pans made of glass, porcelain, stone, earthenware, or any other suitable material, which are set in double rows upon a furnace, in such a manner that the pans which are farthest from the fire are the highest: each pan being a little lower that the preceding one the nearer it is to the fire. Provision is made that the acid may easily flow from one pair of pans to the next lower pair. All the pans are set in a sand-bath, and are supported by iron plates which extend over the fire-place. The acid is poured into the uppermost pair of pans, and thence flows gradually into the next pair, &c., approaching the fire the more, the lower it descends. The pans being of large diameter, and flat, and the acid flowing very slowly through them, nearly all the water contained in them must be evaporated. Provision is made that any sulphuric gases given off by the evaporation may be returned to the vitriol-chamber.

Figure 3:
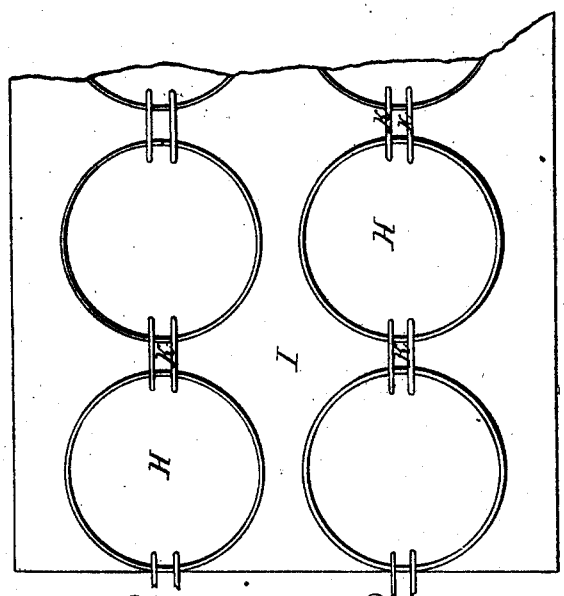
Figure 3 is a top view of a modified plan of my apparatus.
Figure 4:
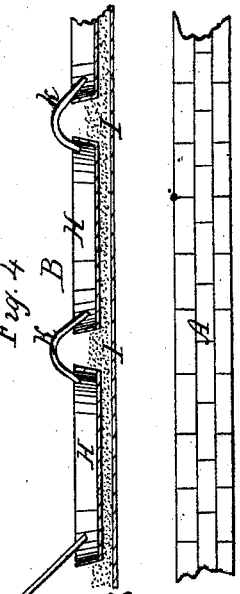
Figure 4 is a longitudinal sectional elevation of the same.
Figure 1:
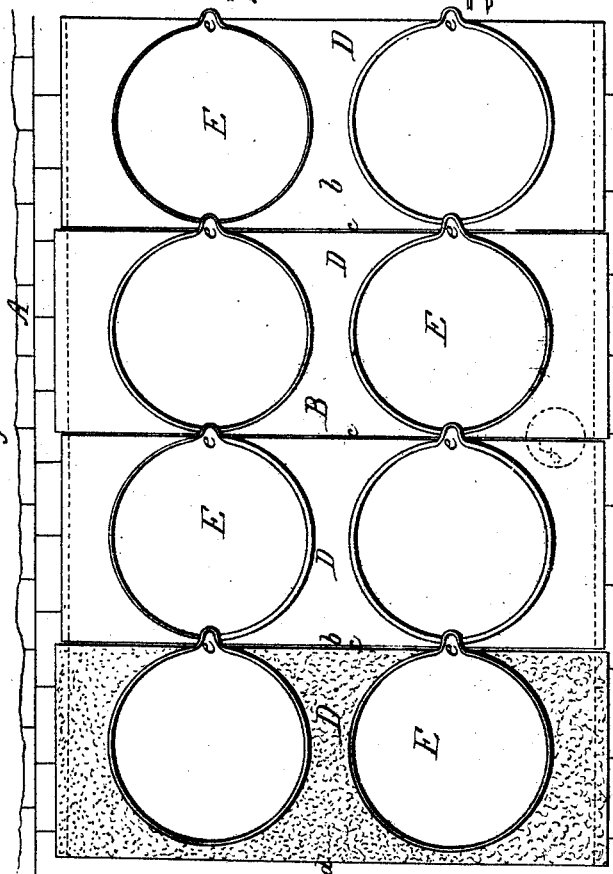
Figure 1 is a plan or top view of my invention.
Figure 2:
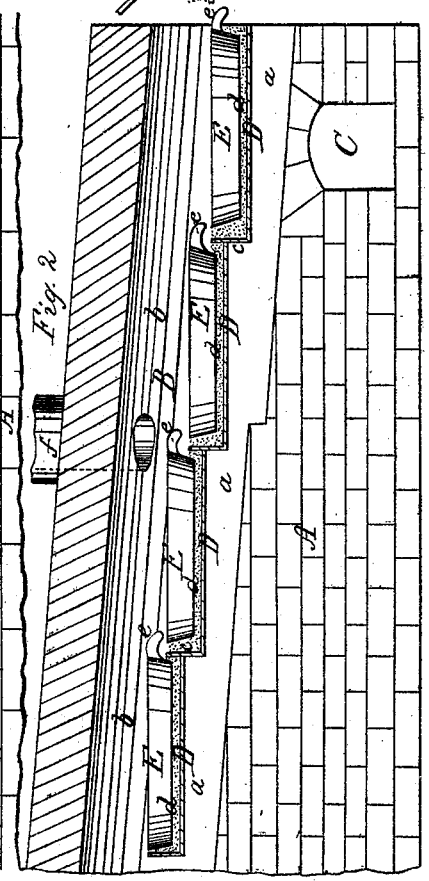
Figure 2 is a longitudinal sectional elevation of the same.

A represents a furnace, built of brick or any other suitable material, being lower at the front than at the rear end. It is arched over, as shown in fig. 2, and a chamber, B, is provided in it, which extends through its whole length, gradually inclining upward the further it is from the fire-chamber C. A series of horizontal plates D D is laid across the chamber B, dividing the same into two compartments, the lower one, $a$, being for the fire and smoke to pass through, while in the upper one, $b$, the pans E are arranged. The plates D are laid in steps one above the other, as shown, the spaces between their ends being closed by vertical plates $c$. Upon the plates D is placed a layer of sand, $d$, upon which the pans E are set. Two pans are set upon each plate D, and each pan is provided with a spout, $e$, whereby the acid is transferred to the next lower pan. The acid to be concentrated is, by means of siphons or otherwise, poured into the uppermost pair of pans, whence it will flow gradually downward until at the lowest pair it is at the required degree of concentration. It is evident that with so much surface and with such a heat almost all the water must be evaporated. A pipe, $f$, is arranged in the arch above the chamber $b$, to conduct any sulphurous gases, given off in the operation, to a condensing apparatus, whence they are returned to the vitriol-chamber. This pipe is arranged so as not to be above any of the pans, as indicated in fig. 1, so that none of the fluid that may be condensed in the pipe can drop into one of the hot pans. A modification of the plan herein described is shown in figs. 3 and 4, in which the chamber B is arranged perfectly level, so that the pans H may also stand level on an iron floor I. The acid is conducted from one pan to another by means of siphons K K, of which two form the connection between every two pans in each row, so that should one break the other one will keep up the communication.

In each apparatus the quantity of the acid poured into the uppermost or rear vessel is regulated so as to let the liquid pass through the pans in the space of time which is found by practice to be required for thoroughly concentrating the sulphuric or other acid. I do not wish to confine myself to any particular number of pans arranged in each furnace, nor to their size.

I claim as new, and desire to secure by Letters Patent—

1. The flat pans E or H, arranged in a furnace substantially as herein shown and described.

2. The furnace A, provided with a longitudinal chamber, B, and with transverse plates D or I, substantially for the purposes and in the manner herein shown and described.

3. The manner herein shown and described of transferring the acid from one pan to another, either by means of spouts *e* and an inclined chamber, B, or by means of siphons K K, substantially as herein shown and described.

4. An apparatus for concentrating sulphuric acid, made and operating substantially as herein shown and described.

The above specification of my invention signed by me this 10th day of December, 1866.

JOHN HUGHES.

Witnesses:
WM. F. MCNAMARA,
ALEX. F. ROBERTS.